(12) United States Patent  
Christianson (10) Patent No.: US 7,992,267 B2  
(45) Date of Patent: Aug. 9, 2011

(54) SNAP LOCK CARABINER

(76) Inventor: Tony Christianson, Yosemite National Park, CA (US)

( * ) Notice: Subject to any disclaimer, the term of this patent is extended or adjusted under 35 U.S.C. 154(b) by 148 days.

(21) Appl. No.: 11/823,197

(22) Filed: Jun. 26, 2007

(65) Prior Publication Data

US 2008/0005876 A1    Jan. 10, 2008

Related U.S. Application Data

(60) Provisional application No. 60/816,774, filed on Jun. 26, 2006.

(51) Int. Cl.  
*F16B 45/02* (2006.01)

(52) U.S. Cl. .................. 24/598.2; 24/599.5; 24/599.7; 24/600.1

(58) Field of Classification Search .......... 24/598.2, 24/599.5, 600.1, 599.7  
See application file for complete search history.

(56) References Cited

U.S. PATENT DOCUMENTS

| | | |
|---|---|---|
| 1,886,726 A | 3/1932 | Pennefather |
| 2,098,466 A | 11/1937 | Rodenbach |
| 4,095,316 A | 6/1978 | Gabriel |
| 4,333,212 A | 6/1982 | Bibollet |
| 4,434,536 A | 3/1984 | Schmidt et al. |
| 4,528,728 A | 7/1985 | Schmidt et al. |
| 4,528,729 A | 7/1985 | Schmidt et al. |
| 4,546,523 A | 10/1985 | Bailey, Jr. |
| 4,645,255 A | 2/1987 | Zepf |
| 4,802,264 A | 2/1989 | Isenhart |
| 4,811,467 A | 3/1989 | Lowe |
| 4,835,823 A | 6/1989 | Contat |
| 4,930,194 A | 6/1990 | Frechin |
| 5,005,266 A | 4/1991 | Fister et al. |
| 5,187,844 A | 2/1993 | Simond |
| 5,210,914 A | 5/1993 | Katsma |
| 5,287,645 A | 2/1994 | Gois |
| 5,329,675 A | 7/1994 | McLean et al. |
| 5,357,657 A | 10/1994 | Petzl |
| 5,384,943 A | 1/1995 | LeFebvre et al. |
| 5,416,955 A | 5/1995 | Katsma |
| 5,463,798 A | 11/1995 | Wurzer |
| 5,577,304 A | 11/1996 | Simond |
| 5,579,564 A | 12/1996 | Rullo et al. |
| 5,608,953 A | 3/1997 | Petzl et al. |
| 5,791,025 A | 8/1998 | Maurice et al. |
| 5,878,834 A | 3/1999 | Brainerd et al. |
| 5,940,943 A | 8/1999 | Kloster |
| 6,161,264 A | 12/2000 | Choate |
| 6,223,372 B1 | 5/2001 | Barber |
| 6,227,015 B1 | 5/2001 | Luquire |
| 6,588,076 B1 | 7/2003 | Choate |
| 6,606,769 B1 | 8/2003 | Harris |
| 6,622,354 B1 | 9/2003 | Klingier |
| 6,715,898 B1 | 4/2004 | Huang |

(Continued)

*Primary Examiner* — James R Brittain (57) ABSTRACT

A locking mechanism is contained within a carabiner's straight or bent gate. The locking mechanism incorporates a pivoting link that can be moved to abut against a transverse pin, thereby immobilizing the gate return spring, which prevents opening movement of the gate. The transverse pin is a material able to resist and distribute forces attempting to open the locked gate. The spring pin is notched to engage the transverse pin thereby simplifying assembly of the carabiner. A low profile protrusion is pushed in the direction of opening the gate to switch the mechanism to the unlocked position. Similarly, another low profile protrusion is pushed in the direction of closing the gate to switch the mechanism to the locked position. The locking and unlocking protrusions are located adjacent the gate hinge so that the gate can be conveniently unlocked, opened, closed and relocked with the fingers of one hand.

26 Claims, 5 Drawing Sheets

U.S. PATENT DOCUMENTS

| | | |
|---|---|---|
| 7,126,484 B1 | 10/2006 | Luquire |
| 7,228,600 B1 | 6/2007 | Selby et al. |
| 7,228,601 B2 | 6/2007 | Thompson |
| 2002/0050032 A1 | 5/2002 | Carnall |
| 2002/0073520 A1 | 6/2002 | Hall |
| 2002/0148093 A1 | 10/2002 | AmRhein |
| 2003/0106190 A1* | 6/2003 | Christianson ............... 24/600.1 |
| 2003/0167608 A1 | 9/2003 | Petzl et al. |
| 2004/0085757 A1 | 5/2004 | Huang |
| 2004/0143945 A1* | 7/2004 | Christianson ............... 24/600.1 |
| 2005/0144730 A1 | 7/2005 | Barber et al. |
| 2005/0172461 A1 | 8/2005 | Hall |
| 2005/0229367 A1 | 10/2005 | Thompson |
| 2005/0246874 A1 | 11/2005 | Hsu |
| 2005/0246875 A1 | 11/2005 | Brown |
| 2005/0278907 A1 | 12/2005 | DiMarchi et al. |
| 2006/0137151 A1 | 6/2006 | Thompson |
| 2006/0174458 A1 | 8/2006 | Carnall et al. |
| 2006/0207073 A1 | 9/2006 | Petzl et al. |
| 2006/0219479 A1 | 10/2006 | Petzl et al. |

* cited by examiner

SNAP LOCK CARABINER

PRIORITY

This application clams the benefit of U.S. Provisional Application No. 60/816,774, filed Jun. 26, 2006.

RELATED APPLICATIONS

The instant invention is related to Provisional Application No. 60/816,774 entitled "Snap Lock Carabiner," filed Jun. 26, 2006, the disclosure of which is incorporated herein by reference.

BACKGROUND OF THE INVENTION

1. Field of the Invention

The instant invention is generally related to climbing aids for rock climbers. More particularly, this invention is related to mechanical devices that link climbing aids together.

2. Description of the Prior Art

Climbers utilize rope, slings and a variety of mechanical devices as climbing aids to assist and protect their movement over rock. The climbing aids serve as a means to anchor the climber to the rock for the purpose of either preventing or arresting a fall.

A carabiner is a mechanical device used to link rope, slings and other climbing aids together. A carabiner is essentially a device used, for example, to attach a climber's body harness to the climbing rope. It is also used to link the climbing rope to anchors placed in or over the rock.

A typical carabiner is palm sized, and either an oblong, oval or "D" shaped ring of a lightweight, high strength material, usually a heat-treated aluminum alloy. One side of the carabiner has a hinged arm that serves as an inward opening gate. The gate is spring loaded to remain normally closed. The normally closed, inward opening gate facilitates insertion of climbing aids such as rope, but impedes inadvertent removal. Objects are released from the carabiner after manually pushing open the gate.

The closing force is provided by a stout compression spring that is housed within the carabiner gate. The spring axis is offset from the pivot pin so that the spring force is directed to close the gate. A link is employed to transfer the spring force to the carabiner body at an appropriate distance from the pivot pin.

The opening end of the gate incorporates an interlocking mechanism that engages the carabiner body when the gate is closed. The interlocking mechanism is typically a transverse pin that mates with a hooked notch in the carabiner body. Another popular configuration includes a keyed arrangement that mates with the carabiner body. These interlocking arrangements allow a closed gate to carry part of the load imposed on the carabiner. Consequently, the carabiner is significantly stronger when the gate is closed. The ultimate strength of a carabiner with the gate open is typically 65% lower than with the gate closed.

During a climb and especially in the event of a fall, the climber's safety is dependent on the security of numerous carabiner links. Consequently, it is imperative that every carabiner in the chain be able to withstand not only the weight of the climber but also the inertial forces generated when the rope arrests a fall.

As the climber progresses upward, the carabiners in a protective chain of climbing aids often rub against the rock. Occasionally, a carabiner gate will catch on a rock or other object, or the rope itself, and may be pushed or pulled open without the climber's knowledge. A carabiner can slap against the rock during a fall causing inertial loads that overcome the closing force of the spring and momentarily open the gate. Also, a rope moving rapidly through a carabiner during a fall can cause the carabiner body to vibrate sufficiently to shake the gate open.

Whenever the gate is opened, even momentarily, there is significant risk that a rope or other attached climbing aid will be inadvertently released. Furthermore, if a sudden load is applied to the carabiner at the instant that the gate is open, the ultimate strength of the carabiner will be significantly compromised and possibly fail. Such occurrences are well known and are considered a significant problem by the climbing community. Consequently, climbers pay careful attention to the placement and orientation of carabiners in order to minimize the chance of an inadvertent opening of the gate.

Climbers often use two carabiners joined by a short length of looped webbing, a combination called a quickdraw. One of the quickdraw carabiners is clipped to an anchor placed in or on the rock. The other quickdraw carabiner is clipped to the climber's rope. The quickdraw allows the rope to pull toward the centerline between staggered anchors thereby providing a less resistive path from the belay point to the climber.

A quickdraw requires the use of two carabiners to attach a rope to a single anchor. Assembling quickdraws with smaller, lightweight carabiners minimizes the weight and bulk penalty of using two carabiners.

A properly placed quickdraw may have the additional benefit of reducing the chance of an inadvertent opening of the gate. Unfortunately this is often not the case. For example, if the rope is incorrectly threaded through the carabiner, a moving rope can twist the carabiner and expose the gate to a sideward opening force. If the rope is pulled across or around the gate, the gate can be inadvertently opened A climber must be very careful when placing and clipping into a quickdraw. The dangling carabiner (the carabiner that will be clipped to the climbers rope) must be oriented so that its gate is away from the rock face. When the rope is clipped in, it must run along the spine of the carabiner, not across the gate.

Many carabiners have a bent gate to facilitate clipping the rope. The gate is bent inward slightly which serves to guide the rope to the opening end. The dangling carabiner of quickdraw configurations customarily has a bent gate.

Placing the rope into the quickdraw's dangling carabiner requires skill and dexterity. Usually the climber is hanging on to the rock surface with one hand, and has only one hand free to clip in the rope. Depending on which hand is free, and the location and orientation of the carabiner relative to the climber, a variation of two techniques is typically used: 1. The carabiner is stabilized with the middle finger, and the rope is clipped in with the thumb and index fingers; or 2. Stabilize the carabiner with the thumb, and clip the rope using the index and middle fingers. No matter the technique used, the carabiner gate must open easily and without hesitation.

There are situations where the risk of an inadvertent opening of the gate is unacceptable, For example, the carabiner used to attach the climbing rope to the climber's body harness must never open inadvertently. Similarly, the carabiner used to attach a belay device to the climber's harness must never open inadvertently. Consequently, harness attachments and the like require greater security, for example, two parallel carabiners or a single carabiner with a locking gate.

Greater security can be obtained by using two carabiners side-by-side with the gates opening in opposite directions. However, extra carabiners solely for the purpose of parallel placement are undesirable because they add considerably to the weight and bulk that the climber must carry.

To avoid the need for side-by-side carabiners, various mechanical means have been developed to directly lock the carabiner gate closed. For example, a popular locking configuration incorporates a sleeve that is threaded, nut like, to the gate. The sleeve can be screwed along the length of the gate, either toward the hinge, or toward the opening end. The sleeve is screwed into the locking position after the rope or other climbing aids have been clipped into the carabiner. In one configuration the gate is locked closed by screwing the sleeve until it crosses the opening end of the gate and jams against the adjacent body of the carabiner. In an alternate configuration the gate is immobilized when the sleeve is screwed over the hinge. Locking or unlocking a carabiner with a threaded sleeve is not instantaneous, that is, it takes time to thread the sleeve from the unlocked position to the locked position and the reverse.

Unfortunately, threaded locking sleeves undesirably add bulk and weight to the carabiner. Threaded locking sleeves are also inherently troublesome. The threads can become clogged with dirt or ice. The sleeve can inadvertently screw out of the locked position when the carabiner rubs across the rock. Furthermore, the gate and threaded cleave mechanism require precise machining and assembly alignment, both of which add to manufacturing cost.

Other solutions of the prior art include gates equipped with spring loaded sliding and/or rotary sleeves. Sliding and/or rotary sleeves function similarly to threaded sleeves, and are often designed to lock automatically and nearly instantaneously when the gate closes. Sliding and rotary sleeves share the same problems as threaded sleeves, and are especially costly to manufacture.

The increased bulk, weight and cost of the prior art limits the number of locking carabiners that a climber carries during a climb or is willing to buy. Consequently, there may be situations during a climb when the climber is compelled to use a non-locking carabiner although a locking type would be preferable or safer.

Although the security of quickdraw applications would benefit from the use of locking carabiners, quickdraws do not incorporate locking carabiners because state-of-the-art locking carabiners are relatively heavy and bulky. The need to be able to easily and instantly clip a rope using only one hand make spring-loaded auto-locking gates especially inappropriate for quick draw use. Furthermore, locking sleeves can only be mounted on straight gates, whereas most quickdraw configurations utilize a bent gate carabiner.

The instant invention is a carabiner incorporating a mechanism that securely and reliably locks the gate closed with the flick of a finger. The inventive locking mechanism is contained inside the gate; therefore it does not add bulk or weight to the carabiner and is less susceptible to jamming by contamination. The inventive locking mechanism has a snap action toggle that maintains the gate unlocked until the climber desires to lock it. The instant invention is ideally suited for quickdraw applications because there is not a weight or bulk penalty, it works with bent gates, and the gate will remain unlocked for clipping a rope, but can be easily and quickly locked after the rope is in place.

SUMMARY OF THE INVENTION

The instant invention is a locking mechanism contained within a carabiner's straight or bent gate. The locking mechanism incorporates a pivoting link that can be moved to abut against a transverse pin, thereby immobilizing the gate return spring, which prevents opening movement of the gate. The transverse pin is a material able to resist and distribute forces attempting to open the locked gate. The spring pin is notched to engage the transverse pin thereby simplifying assembly of the carabiner. A low profile protrusion is pushed in the direction of opening the gate to switch the mechanism to the unlocked position. Similarly, another low profile protrusion is pushed in the direction of closing the gate to switch the mechanism to the locked position. The locking and unlocking protrusions are located adjacent the gate hinge so that the gate can be conveniently unlocked, opened, closed and relocked with the fingers of one hand.

DESCRIPTION OF THE DRAWINGS

A detailed description of the invention is made with reference to the accompanying drawings wherein like numerals designate corresponding parts in the several FIGS.

DESCRIPTION OF THE PREFERRED EMBODIMENT

The following detailed description is of the best presently contemplated modes of carrying out the invention. This description is not to be taken in a limiting sense, but is made merely for purposes of illustrating the general principles of the invention.

Figure 1:
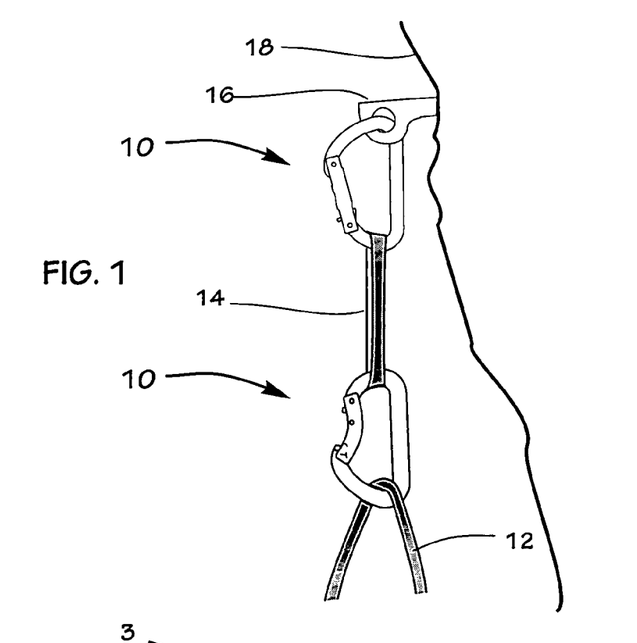
FIG. 1 is a pictorial view of two inventive carabiners in a quickdraw application linking rope and an anchor.

Referring to FIG. 1, two inventive carabiners 10 are shown linked by looped webbing 14 to form a quickdraw configuration. One inventive carabiner 10 has a straight gate and is clipped to piton 16, which is anchored to rock wall 18. The other inventive carabiner has a bent gate and is clipped to climbing rope 12. Piton 16 is representative of one of many types of anchors used by climbers. FIG. 1 exemplifies one of the ways that carabiners are used to link climbing aids together.

Figure 2:
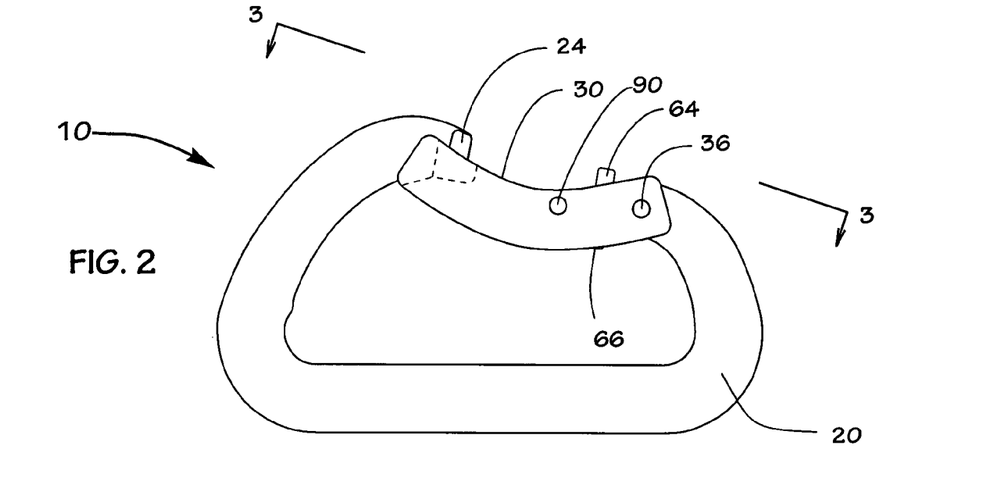
FIG. 2 is a side elevation view of a bent gate carabiner incorporating the inventive locking mechanism.

Referring to FIG. 2, carabiner 10 includes body 20 and gate 30. Body 20 and gate 30 are fabricated from a lightweight, high strength material, for example aluminum alloy type 7075 heat treated to condition T6.

The preferred configuration of the inventive locking mechanism is illustrated by FIGS. 2-7. The terms "top" and "bottom"; "above" and "below" refer to the orientation of carabiner 10 shown by FIG. 2.

Figure 3:
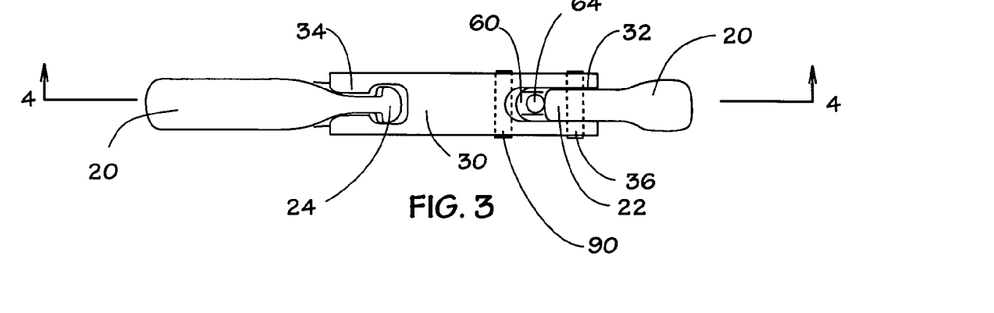
FIG. 3 is a top view of the carabiner as seen in the direction 3-3 of FIG. 2.

Referring to FIG. 3, gate 30 is slotted at both ends by slots 32 and 34. Leg end 22 of body 20 nests loosely within the confines of slot 32. Gate 30 is hinged to body 20 by pin 36 which transverses slot 32 through a slip-fitting hole in leg end 22.

The carabiner pictured in FIGS. 2-7 uses a keyed arrangement to interlock the opening end of gate 30 to leg end 24 of body 20. Slot 34 is machined or formed to mate with a corresponding bulbous extension of leg end 24. The interlocking relationship serves to hold the gate closed when high tensile load is deform body 20, thereby enabling gate 30 to carry part of the load transmitted through body 20. Consequently, the carabiner is significantly stronger when the gate is closed.

Figures 4, 5, 6:
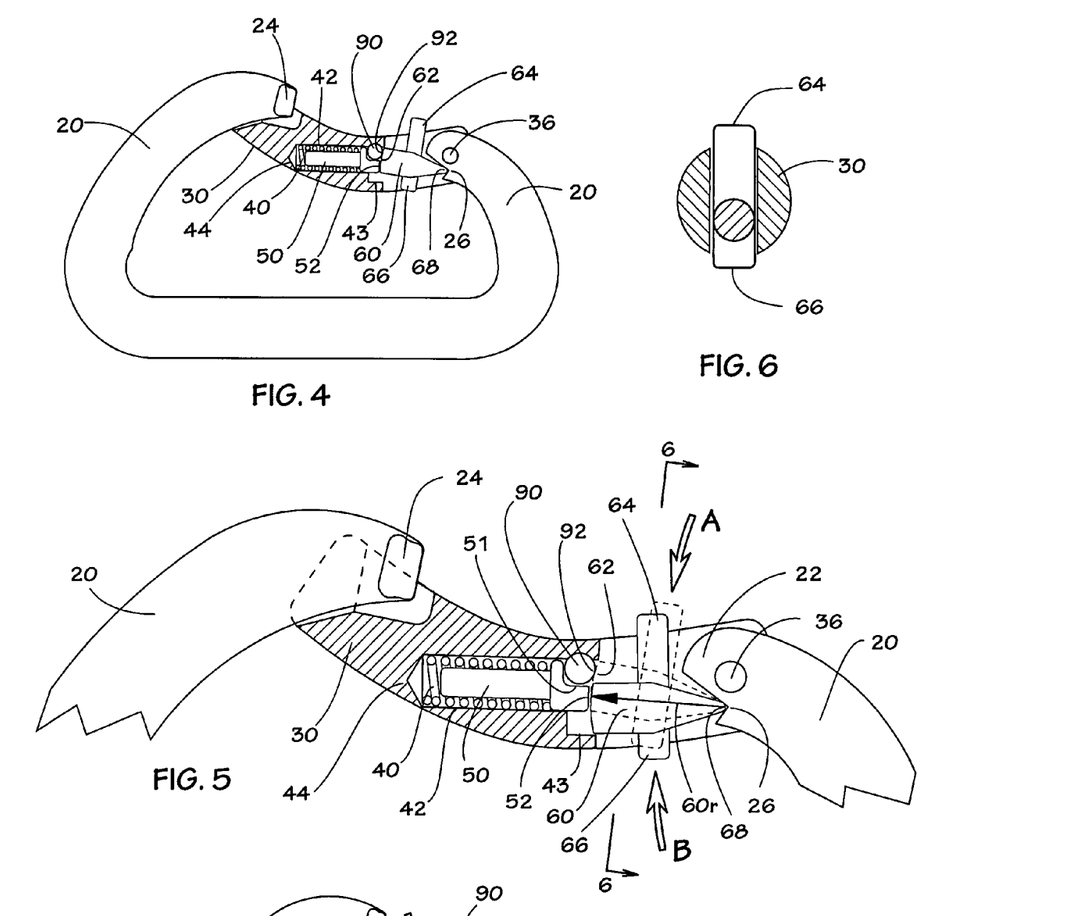
FIG. 4 is a partial sectional view of the inventive carabiner, taken along a cut corresponding to line 4-4 of FIG. 3, showing the locking mechanism locked.
FIG. 5 is a partial close-up sectional view of the carabiner of FIG. 4.
FIG. 6 is a sectional view of the carabiner, taken along a cut corresponding to line 6-6 of FIG. 5.
Figure 8:
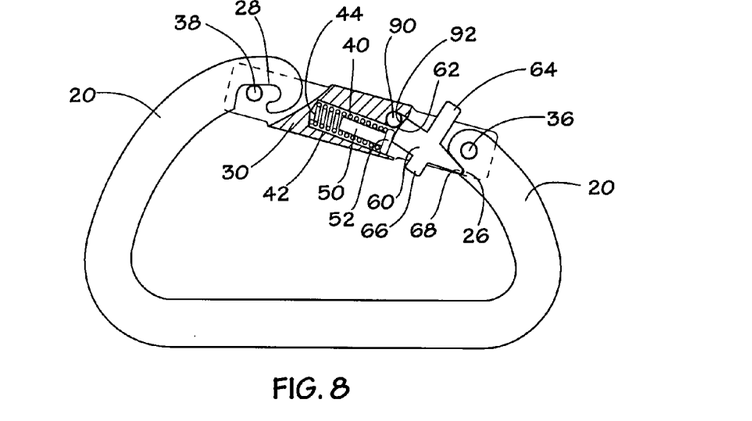
FIG. 8 is a partial sectional view showing a straight gate carabiner incorporating an alternate configuration of the inventive locking mechanism.

The inventive locking mechanism is located within gate 30. FIG. 4 pictures gate 30 bent at mid-length, however as seen in FIG. 8, the carabiner can also have a straight gate. The inventive locking mechanism is locked or unlocked by pivoting control link 60. A finger moves control link 60 by pushing either protrusion 64 or protrusion 66. Protrusion 64 extends a short distance above gate 30 when the inventive locking mechanism is locked. Protrusion 66 extends a short distance below gate 30 when the inventive locking mechanism is unlocked.

The operation of control link 60 is intuitive because protrusions 64 and 66 are located so that the gate locks when protrusion 66 is pushed in the direction of closing gate 30, and the gate unlocks when protrusion 64 is pushed in the direction of opening gate 30. This intuitive control of the locking mechanism avoids confusion and is especially valuable when a climber is faced with demanding or strenuous conditions. Furthermore, as a safety feature the location of protrusion 66 causes the gate to lock or remain locked if a rope or other climbing aid clipped inside the inventive carabiner inadvertently pushes against protrusion 66.

Referring to FIG. 5, gate 30 is urged to the closed position by the combined action of compression spring 40, spring pin 50 and control link 60. Compression spring 40 and spring pin 50 are loosely contained within hole 42. Hole 42 opens into slot 32.

Compression spring 40 is typically fabricated by coiling a corrosion resistant material, for example 17-7 PH stainless steel spring wire. Spring pin 50 is fabricated by machining a corrosion resistant material, for example brass or stainless steel. Machining, swaging or forging a corrosion resistant material, for example brass or stainless steel, are typical ways to fabricate control link 60.

Compression spring 40, in conjunction with spring pin 50, applies a force against compression surface 62 of control link 60. Control link 60 transmits the force through tip 68 to notch 26 on body 20. Notch 26 is adjacent but offset inward from the center of hinge pin 36. The offset distance provides the leverage that pushes gate 30 closed. To keep gate 30 firmly closed, compression spring 40 is somewhat compressed even when gate 30 is closed.

Referring again to FIGS. 2 and 3, control link 60 is located within slot 32 adjacent leg 22 of body 20. Control link 60 protrudes a short distance above the top of gate 30 at 64, and a short distance below gate 30 at 66. Sufficient clearance is provided between slot 32 and control link 60 so that control link 60 can move without binding.

Figure 7:
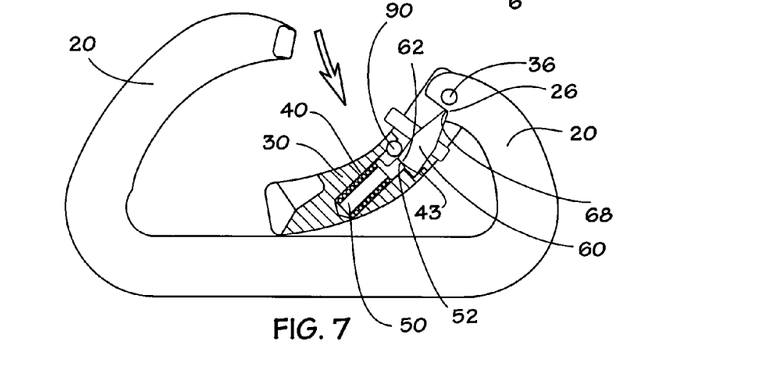
FIG. 7 is a partial sectional view of the carabiner of FIG. 4, showing the gate open.

Control link 60 pivots around tip 68. Tip 68 nests within notch 26. Referring to FIG. 7, when an external force (depicted by the outline arrow in FIG. 7) causes gate 30 to open, control link 60 pushes spring pin 50 into hole 42, compressing spring 40. Opening movement of gate 30 carries control link 60 with it, causing tip 68 to pivot at notch 26. For gate 30 to open, that portion of control link 60 having compression surface 62 must move with pin 50 into hole 42 and recess 43 adjacent hole 42. When gate 30 is open, the force of spring 40 against control link 60 urges gate 30 to return to the closed position.

Referring to FIG. 5, control link 60 can be moved to a down position or an up position by pushing in the direction of outline arrows "A" or "B" respectively. Control link 60 moves in a short arc from one position to the other by pivoting tip 68 within notch 26. The pushing of control link 60 by force "A" is facilitated by protrusion 64. The pushing of control link 60 by force "B" is facilitated by protrusion 66. Moving control link 60 in the direction of arrow "A" causes control link 60 to move to the unlocked position. Moving control link 60 in the direction of arrow "B" causes control link 60 to move to the locked position (control link 60 is shown in the locked position as a dashed line in FIG. 5.)

Referring to the locked position shown in FIGS. 4 and 5, control link 60 has pivoted so that compression surface 62 no longer completely aligns with surface 52, but also abuts locking surface 92 of pin 90. Pin 90 transverses gate 30. The abutment of compression surface 62 with locking surface 92 immobilizes control link 60, which consequently immobilizes gate 30.

When control link 60 moves between the locked and unlocked positions, compression surface 62 slides across surface 52. Smooth movement of control link 60 is facilitated when surfaces 52, 92 and 62 line-up and are relatively smooth. Furthermore, movement of control link 60 is also facilitated when surface 52 is perpendicular to an intersection with the pivot point of control link 60. Accordingly, the center axis of hole 42 approximately intersects notch 26 on body 20.

Forming compression surface 62 as an arc or spherical surface having radius 60r centered at tip 68 facilitates pivotal movement of control link 60. As best seen in FIGS. 4 and 5, spring 40 forces surface 52 against surface 62, and portions of surfaces 62 and 52 are always in contact. Consequently friction holds control link 60 either in the locked or unlocked position.

The tangential relationship of surfaces 52 and 62 with respect to notch 26, and their relative locations within gate 30 with respect to pin 90, are chosen to enable control link 60 to have two stable positions, either locked or unlocked. As such, control link 60 operates as a switch that can be pivoted from one stable position to the other by either pushing against protrusion 64 or protrusion 66. Movement from the locked to the unlocked position, and the opposite, produces an audible "snap" that can be heard by the climber. In addition, the position of control link 60, either up or down, provides a visual and tactile indication of the state of the inventive locking mechanism.

As described supra, when compression surface 62 abuts surface 92, gate 30 cannot move. For the inventive carabiner to be assembled and lock properly, dimensions must be chosen and manufacturing tolerances controlled so that compression surface 62 will make proper contact with locking surface 92 when gate 30 is closed and locked.

A small amount of clearance between surfaces 62 and 92 is required to allow pivotal movement of control link 60 to and from the locked position. On the other hand, if too large a gap exists between surfaces 62 and 92, for example due to excessive tolerance stack-up or wear and tear, unwanted movement of gate 30 will occur before the two surfaces engage. Conversely, if the fit is too tight it will be difficult to assemble the carabiner and it may not be possible to move control link 60 to the locked position.

Pin 90 is preferably hardened steel so there will be little or no wear of the pin over the lifetime of the inventive carabiner clue to locking and unlocking movement of control link 60. Furthermore, dimensional variations clue to tolerance stack-up can be compensated by slightly changing the curvature of compression surface 62 so that locking movement of control link 60 progressively engages locking surface 92 of pin 90.

The preferred configuration incorporates pin 90 to distribute forces from compression surface 62 into the structure of gate 30. For the preferred configuration of FIGS. 2-7, pin 90 at least partially overhangs the opening of hole 42. The intersection of pin 90 with hole 42 allows locating pin 90 and hole 42 within the space constraints of a bent gate. Spring pin 50 is notched at 51 to provide clearance around the overhanging portion of pin 90. Pin 90 advantageously holds spring 40 and spring pin 50 inside hole 42 during subassembly, which significantly helps the assembly process.

Figure 9:
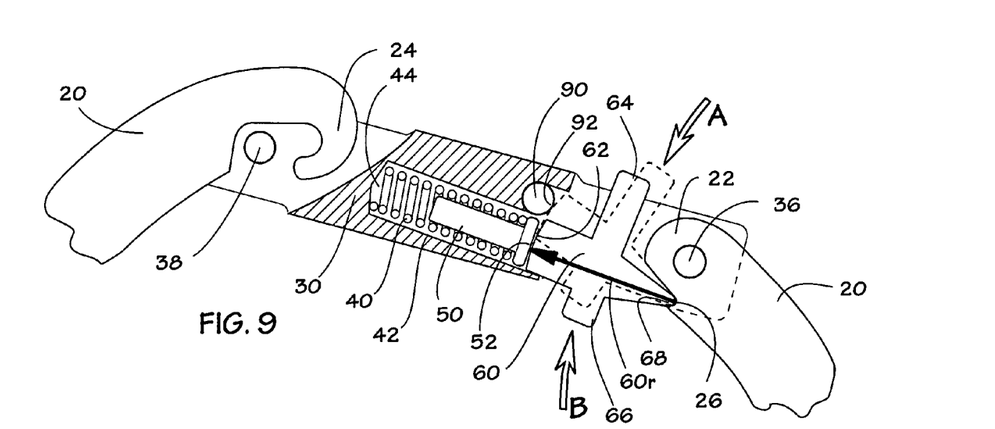
FIG. 9 is a partial close-up sectional view of the carabiner of FIG. 8.
Figure 10:
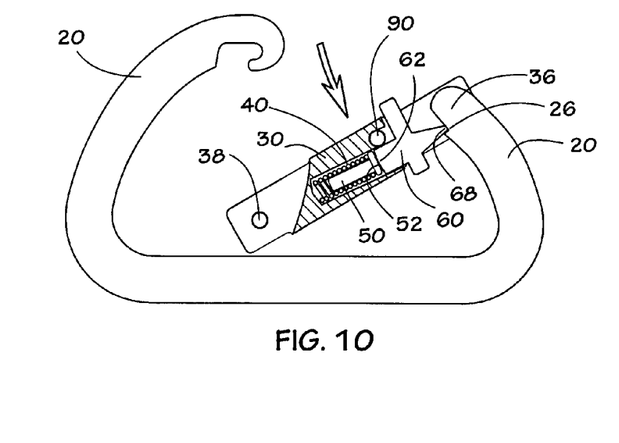
FIG. 10 is a partial sectional view of the carabiner of FIG. 5, showing the gate open.

FIGS. 8-10 picture an alternate configuration of the inventive locking mechanism that works the same as described for the configuration of FIGS. 2-7. As examples of other carabiner configurations that can incorporate the inventive locking mechanism, FIGS. 8-10 show gate 30 straight and the opening end of the gate uses a pin and slot interlocking configuration to engage the carabiner body when the gate is closed.

The opening end of gate 30 includes pin 38 which transverses slot 34. When gate 30 is closed, pin 38 rests against the top of notch 28 in body 20, thereby limiting the closing movement of gate 30. Notch 28 also serves to capture pin 38 when high tensile loads deform body 20, thereby enabling gate 30 to carry part of the load transmitted through body 20. Consequently, the carabiner is significantly stronger when the gate is closed.

Referring to FIG. 9, pin 90 does not overhang the opening of hole 42, consequently spring pin 50 does not need notch 51 nor does gate 30 need recess 43 adjacent the opening of hole 42. Although the number of machining steps needed to fabricate this configuration is reduced, assembly is somewhat more difficult because the spring and spring pin are not retained by pin 90 during subassembly.

Figure 11:
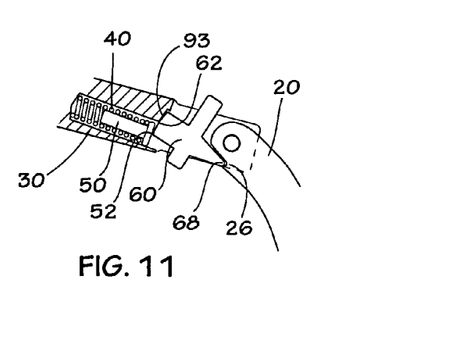
FIG. 11 is a partial sectional view showing yet another alternate configuration.

Referring to FIG. 11, there is shown a configuration of the inventive carabiner in which surface 93 is machined a part of gate 30. The material of choice for gate 30 is a lightweight, high strength material, for example aluminum alloy type 7075. The configuration of FIG. 11 is not ideal because although an aluminum alloy is a strong material, its surface is relatively soft and wears quickly in comparison to a harder material, for example steel. Repeated locking and unlocking of control link 60 will eventually wear a relatively soft surface 93, resulting in unwanted movement of gate 30 when the inventive carabiner is locked.

Figure 12:
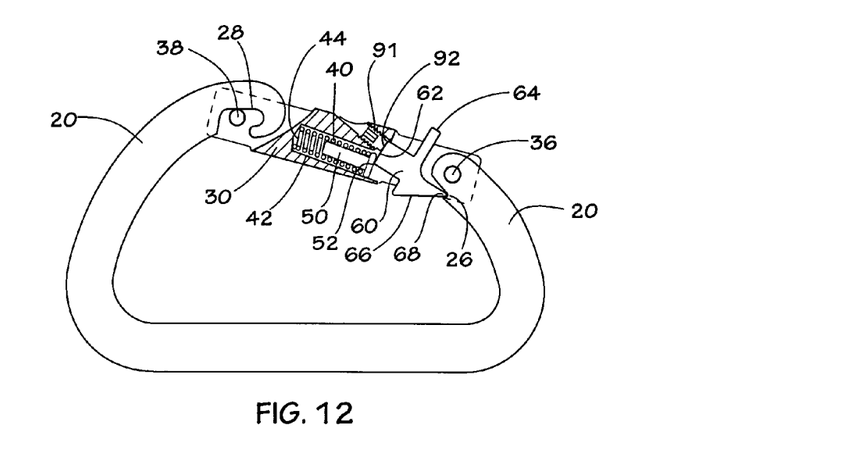
FIG. 12 is a partial sectional view showing a carabiner incorporating yet another alternate configuration of the inventive locking mechanism
Figure 13:
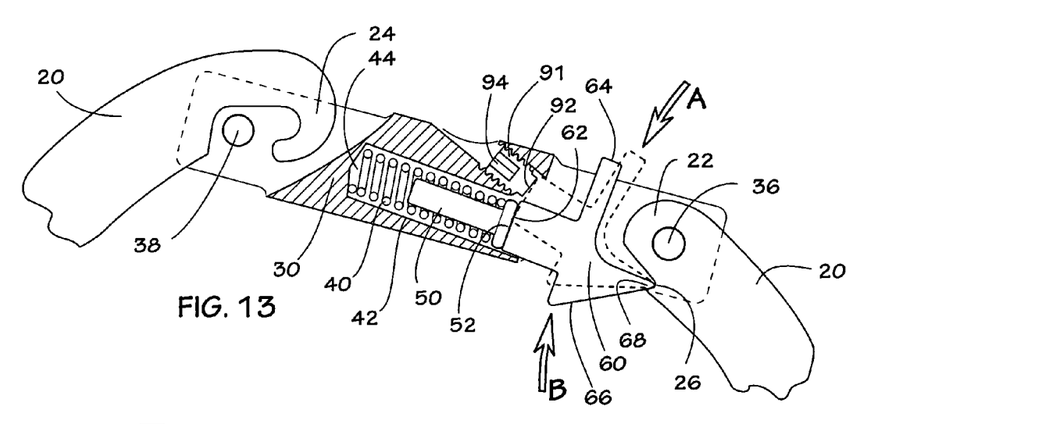
FIG. 13 is a partial close-up sectional view of the carabiner of FIG. 12.
Figure 14:
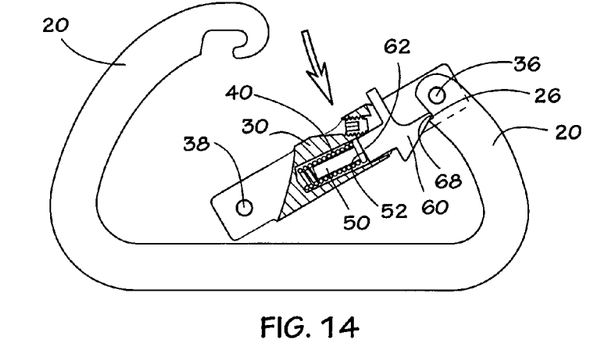
FIG. 14 is a partial sectional view of the carabiner of FIG. 12, showing the gate open.

FIGS. 12-14 show an alternate configuration that provides adjustment for the location of locking surface 92. Setscrew 91 is provided so that the location of locking surface 92 can be adjusted relative to compression surface 62 to compensate for dimensional variations of the various components. Screwing setscrew 91 in or out with respect to gate 30 adjusts the location of surface 92, thereby providing the proper clearance between surfaces 62 and 92. End 94 of setscrew 91 is configured to facilitate adjustment by a screwdriver or socket-driver or-the-like after the carabiner has been assembled.

During assembly of the inventive carabiner, setscrew 91 is retracted to provide ample clearance between the various components. After the inventive carabiner is assembled, control link 60 is moved to the locked position and setscrew 91 adjusted until locking surface 92 just makes contact with surface 62. At the point where locking surface 92 makes proper contact with surface 62, gate 30 will be unable to open unless control link 60 is moved to the unlocked position. After setscrew 91 is properly adjusted, a thread locking-compound, for example locktite, or a high-strength epoxy can be used to preserve the adjustment and strengthen the threads.

Referring to the unlocked position shown in FIG. 13, the movement of control link 60 in direction "A" has moved compression surface 62 away from setscrew 91 and surface 92. When compression surface 62 completely lines-up with surface 52 of spring pin 50, control link 60 will be able to move axially with spring pin 50 into hole 42; therefore gate 30 can be opened as shown in FIG. 14.

Figure 15:
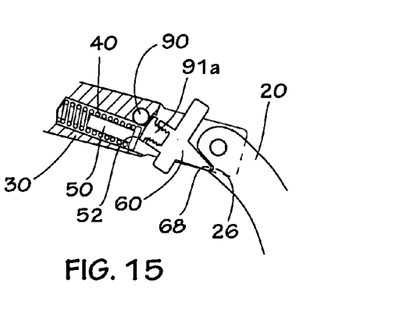
FIG. 15 is a partial sectional view showing yet another alternate configuration.

FIG. 15 shows an alternate configuration in which the length of control link 60 can be adjusted by threading screw 91a into the blunt end of control link 60. Screw 91a is adjusted to provide the proper clearance between surfaces 62 and 92. Screw 91 a must be adjusted before assembly, an arrangement that is not as convenient as the configuration of FIG. 12. Other configurations can be used to adjust the length of control link 60, for example control link 60 can be configured as two parts that mate together without threads that provide an adjustment for length by using shims or spacers or-the-like between the two parts.

Figure 16:
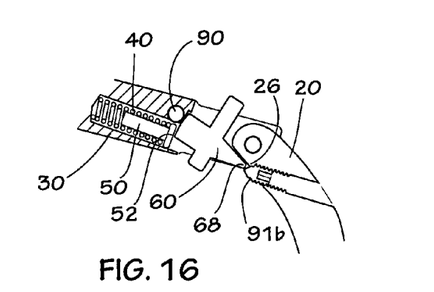
FIG. 16 is a partial sectional view showing yet another alternate configuration.

FIG. 16 shows another alternate configuration in which the location of notch 26 can be adjusted. Screw 91b threads into the leg end of body 20. Screw 91b is adjusted to provide the proper clearance between surfaces 62 and 92. Screw 91b is configured to facilitate adjustment by a screwdriver or socket-driver or-the-like after the carabiner has been assembled.

Figure 17:
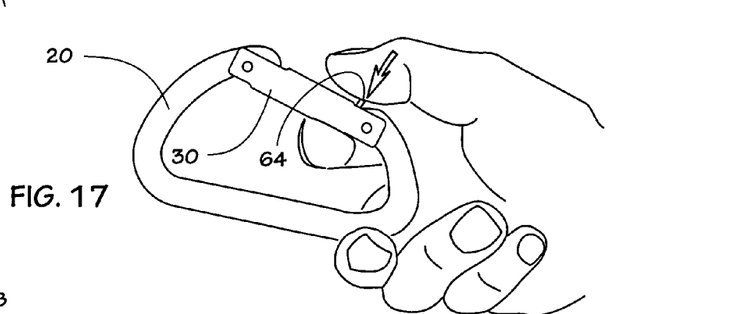
FIG. 17 is a pictorial view showing one hand unlocking the inventive locking mechanism.
Figure 18:
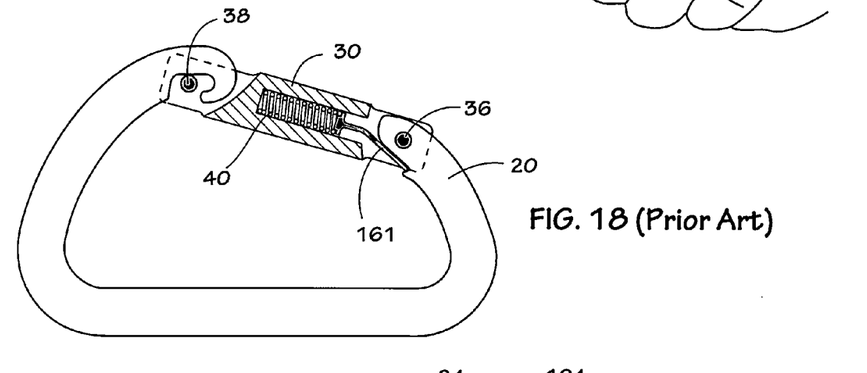
FIG. 18 is a partial sectional view of a typical Prior Art non-locking carabiner.

Climbers are often in precarious positions in which only one hand is available to insert a rope into a carabiner (typically the other hand is occupied holding on to another climbing aid or the rock surface). Under such circumstances it is imperative that the carabiner be unlocked and easily opened. Because the inventive locking carabiner has two stable positions, either locked or unlocked, and control link 60 can be easily moved with one finger; a climber can unlock the carabiner (if it is not already unlocked), open and close gate 30 as many times as need, and when appropriate, lock the carabiner, all with the use of one hand. FIG. 17 illustrates one of the many ways the inventive carabiner can be unlocked with one hand, FIG. 18 is a partial cross section of a typical prior art, non-locking carabiner. A comparison of the inventive configuration of FIG. 4 with FIG. 18 will reveal that conversion to the preferred inventive locking configuration requires the replacement of link 161 with control link 60 and the addition of spring pin 50 and pin 90. Gate 30 must be appropriately machined to accommodate control link 60 and pin 90. Because the gate return spring provides the force that, in addition to closing the gate, holds the inventive locking mechanism either in the locked or unlocked positions, the new components and accompanying modifications can be incorporated with little addition to the manufacturing cost of a basic carabiner. Consequently, a carabiner incorporating the preferred inventive locking mechanism can be sold with a relatively small price increase over the cost of a non-locking version.

Figure 19:
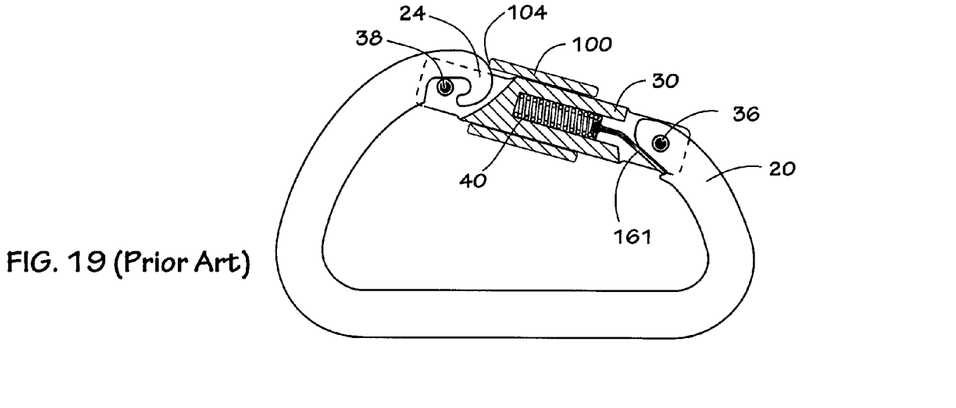
FIG. 19 is a partial sectional view of a typical Prior Art locking carabiner.

FIG. 19 is a partial cross section of a typical prior art locking carabiner. Sleeve 100 is threaded nut-like to gate 30 and can be screwed along the length of gate 30 either toward or away from leg end 24 of body 20. FIG. 19 pictures sleeve 100 in position against leg end 24, thereby immobilizing gate 30. The prior art configuration illustrated by FIG. 19 is securely locked when sleeve 100 is jammed against leg end 24.

The prior art configuration illustrated by FIG. 19 is considered by climbers to be the "gold standard" of locked security and is the preferred configuration for attaching climbing rope, rappelling and belay equipment and-the-like to the climber's body harness. However the locking carabiner of FIG. 19 is not suitable for quickdraw use due to its weight and the possibility that the gate may be locked or will lock when a climber is trying to clip a rope. Furthermore, the locking sleeve of FIG. 19 will not function on a bent gate carabiner.

Other variations on the shape and/or relative locations of the carabiner body, gate, spring, linkage and lock release are contemplated. For example the locking mechanism could conceivably be reversed in orientation so that the tip in the control member pivots within a notch in the gate and the spring assembly is located within a hole in the leg end of the body. It is understood that those skilled in the art may conceive of modifications and/or changes to the invention described above. Any such modifications or changes that fall within the purview of the description are intended to be included therein as well. This description is intended to be illustrative and is not intended to be limitative. The scope of the invention is limited only by the scope of the claims appended hereto.

I claim:

1. A locking carabiner, comprising:
  a body including a leg end and an opening end, where a gap separates the leg end and the opening end;
  a gate having a longitudinal axis and an opening end and a hinged end joined to the leg end of the body and configured to pivot between a closed position, in which the gate spans the gap between the leg end and the opening end of the body, to an open position, in which a gap exists between the opening end of the gate and the opening end of the body;
  a control member pivotally connected to the leg end of the body and moveable between an unlocked position and a locked position;
  wherein the gate includes a hole having an opening;
  wherein a spring and spring pin are substantially contained within the hole;
  wherein the control member includes a compression surface;
  wherein the gate includes a load distributing member transverse the gate and adjacent the hole opening;
  said load distributing member having a longitudinal axis substantially perpendicular to the gate's longitudinal axis;
  wherein the gate and the control member are configured so that pivoting the gate from the closed position when the control member is in the unlocked position causes insertion of the compression surface of the control member through the hole opening and the compression of the spring and spring pin against the compression surface of the control member;
  wherein the compression surface of the control member is configured to engage the side of the load distributing member when the control member is in the locked position, which prevents the gate from pivoting from the closed position when the control member is in the locked position.

2. The locking carabiner of claim 1, wherein the gate and control member are configured so that the compression of the spring and spring pin against the compression surface of the control member forces the gate from the open position to the closed position.

3. The locking carabiner of claim 1, wherein the gate and the control member are configured so that neither the gate nor the control member can move when the compression surface of the control member engages the load distributing member.

4. The locking carabiner of claim 1, wherein the gate and the control member are configured so that forces applied to pivot the gate from the closed position pinch the control member between the load distributing member and the leg end of the body, which prevents rotation of the gate when the control member is in the locked position.

5. The locking carabiner of claim 1, wherein the load distributing member is a smooth pin.

6. The locking carabiner of claim 5, wherein the pin at least partially intersects the hole that contains said spring and spring pin.

7. The locking carabiner of claim 5, wherein the pin is hardened steel.

8. The locking carabiner of claim 1, wherein the length of the control member can be adjusted.

9. The locking carabiner of claim 8, wherein the compression surface is a screw located within the control member.

10. The locking carabiner of claim 1, wherein:
  the control member includes a locking protrusion; and
  the control member is configured so that force applied to the surface of the locking protrusion pivots the control member toward the closed position of the gate.

11. The locking carabiner of claim 10, wherein the control member is configured so that application of force to the surface of the locking protrusion when the control member is in the unlocked position pivots the control member into the locked position.

12. The locking carabiner of claim 1, wherein:
  the control member includes an unlocking protrusion; and
  the control member is configured so that force applied to the surface of the unlocking protrusion pivots the control member toward the open position of the gate.

13. The locking carabiner of claim 12, wherein the control member is configured so that application of force to the surface of the unlocking protrusion when the control member is in the locked position pivots the control member into the unlocked position.

14. The locking carabiner of claim 1, wherein:
  the leg end of the body includes a notch adjacent the hinge;
  the control member includes a tip that nests within the notch; and
  the control member is configured to pivot about the tip.

15. The locking carabiner of claim 14, wherein the location of the notch can be adjusted.

16. The locking carabiner of claim 14, wherein the notch is a screw located within the leg end.

17. The locking carabiner of claim 14, wherein the central axis of the hole that contains said spring and spring pin approximately intersects the notch in the leg end of the body.

18. The locking carabiner of claim 1, wherein the gate is bent.

19. The locking carabiner of claim 1, wherein the gate is straight.

20. The locking carabiner of claim 1, wherein the opening end of the body is configured to interlockingly engage the opening end of the gate.

21. The locking carabiner of claim 1, wherein the spring pin is notched to engage the load distributing member.

22. A locking carabiner having a hinged gate that can pivot between an open position and a closed position and a control member adjacent the gate hinge that can pivot between a locked position where the gate is immobilized in the closed position when the control member engages a locking member that distributes the load transversely across the gate, and an unlocked position, where pivoting the gate from the closed position compresses a spring within the gate by moving a notched spring pin that can engage both the control member and the locking member.

23. The locking carabiner of claim 22, wherein the locking carabiner includes a bent gate.

24. The locking carabiner of claim 22, wherein:
the locking carabiner includes the control member having a locking protrusion and an unlocking protrusion;
positioning the control member in the unlocked position comprises pressing the unlocking protrusion toward the open position; and
positioning the control member in the locked position comprises pressing the locking protrusion toward the closed position.

25. A locking carabiner, comprising:
a body including a leg end and an opening end, where a gap separates the leg end and the opening end;
a gate hinged to the leg end of the body and configured to pivot between a closed position, in which the gate spans the gap between the leg end and the opening end, to an open position, in which a gap exists between the gate and the opening end;
a control member pivotally connected to the leg end of the body and moveable between an unlocked position and a locked position;
wherein the gate includes a hole having an opening;
wherein a spring and spring pin are substantially contained within the hole;
wherein the control member includes an adjustable compression surface;
wherein the gate includes a load distributing member adjacent the hole opening;
wherein the gate and the control member are configured so that pivoting the gate from the closed position when the control member is in the unlocked position causes insertion of the compression surface of the control member through the hole opening and the compression of the spring and spring pin against the compression surface of the control member;
wherein the compression surface of the control member is configured to engage the load distributing member when the control member is in the locked position, which prevents the gate from pivoting from the closed position when the control member is in the locked position.

26. The locking carabiner of claim 25, wherein the adjustable compression surface is a screw located within the control member.

* * * * *